United States Patent [19] [11] 3,900,649
Hart et al. [45] Aug. 19, 1975

[54] MOULDED ARTICLES

[75] Inventors: Frederick Leslie Hart, Cressage; Herbert John Sharp, Greenford, both of England

[73] Assignees: GKN Sankey Limited, Stafford; Aro Plastics Development Limited, London, both of England

[22] Filed: Jan. 25, 1974

[21] Appl. No.: 436,647

[30] Foreign Application Priority Data

Oct. 19, 1970 United Kingdom ............ 49523/70

Related U.S. Application Data

[63] Continuation-in-part of Ser. No. 189,937, Oct. 18, 1971, abandoned.

[52] U.S. Cl. ................ 428/76; 161/166; 161/218; 52/309; 264/278; 29/472.9; 29/473.3; 428/101; 428/212; 428/378
[51] Int. Cl. .............................................. B32b 7/04
[58] Field of Search ......... 161/166, 160, 7, 218, 49, 161/139, 410; 52/309, 656; 138/114, 146; 264/271, 275, 264, 278, 277, 279; 29/472.9, 473.3

[56] References Cited
UNITED STATES PATENTS

| 3,256,532 | 6/1966 | Lindsey et al. ........................ 52/656 |
| 3,301,277 | 1/1967 | Kelly ................................... 138/114 |
| 3,445,113 | 5/1969 | Satchell et al. ....................... 264/278 |
| 3,702,355 | 11/1972 | Hayden ............................... 264/264 |
| 3,725,995 | 4/1973 | Sharp .................................. 264/278 |
| 3,787,549 | 1/1974 | Stanley et al. ....................... 264/278 |

Primary Examiner—George F. Lesmes
Assistant Examiner—Stanley S. Silverman
Attorney, Agent, or Firm—Merriam, Marshall, Shapiro & Klose

[57] ABSTRACT

A composite article comprising a metal reinforcing core completely encapsulated in a covering layer of plastics material which has a co-efficient of thermal expansion over a predetermined temperature range greater than the coefficient of thermal expansion of the metal core which presents to the plastics material a first smoothly curved concave surface which, at a first temperature at the upper end of said range, is engaged by, but not bonded to, a portion of the covering layer which has a second, concave, smoothly curved, external surface, the first and second surfaces being aligned, the curvature of said first surface and the thickness of said portion being such that at a second temperature at the lower end of said range said portion has lifted away from said first surface thus reducing the tensile stresses which occur in said portion due to differential contraction of the plastics material and the core as the temperature of the article is reduced from the upper end to the lower end of said temperature range as compared with the tensile stresses which would occur in the plastics material if it were unable to lift off said first concave surface.

4 Claims, 4 Drawing Figures

MOULDED ARTICLES

CROSS REFERENCE TO RELATED APPLICATION

This application is a continuation in part of Application Ser. No. 189,937 filed 18th Oct. 1971 and now abandoned.

BACKGROUND OF THE INVENTION

1. Field of the Invention

This invention relates to composite articles. By a "composite article" we mean an article comprising a reinforcing metal core completely embedded in plastics material.

2. Description of the Prior Art

One of the problems encountered with such composite articles is the tendency for the plastics material to crack during cooling to which the article is subjected in use. These cracks occur due to the difference between the average co-efficient of thermal expansion of the plastics material over the service temperature range of the article and the co-efficient of thermal expansion of the metal, of the core. The average co-efficient of thermal expansion of the plastics material over a normal service temperature range is usually a number of times that of the metal. Assuming that at a "normal" temperature of the article the plastics covering is in intimate contact with the core and is insufficiently stressed to crack, then if the article is heated above this temperature the plastics material expands at a greater rate than the metal and so there is no tendency for the plastics material to crack due to tension stresses in the material. If, however, the article is cooled below such normal temperature, the plastics material will contract at a greater rate than the metal, so that over a given time period the plastics material will contract by a greater amount than the core with the result that the plastics material is stretched over the core and, during this stretching, cracks can appear in the plastics material due to the tension stresses developed therein.

Where, for example, the composite article is a rectangular frame comprising a rectangular core completely encapsulated or embedded in plastics material, during cooling of the article from its normal temperature tension stresses acting in perpendicular directions will be set up in the plastics material covering the core, i.e. each element of the plastics material will be tensioned by stresses acting in perpendicular directions, ignoring any stresses caused by changes in thickness of the covering due to the cooling.

Thus considering a ring-like element of the plastics material surrounding the core and half way along one side of the frame, such an element will be subjected during cooling to a tension stress circumferentially of the core, i.e. a hoop stress, due to the fact that the cross-sectional dimensions of the core are reducing at a lower rate than those of the plastics material. The element will also be tensioned longitudinally of the frame side due to the fact that the length of the core within the frame side is reducing at a lower rate than is the length of the element of plastics material.

It is an object of the invention to provide a composite article having a metal core which is totally embedded or encapsulated in plastics material and in which the tension stresses in the plastics material which are caused on cooling as explained above are reduced as compared with known constructions.

SUMMARY OF THE INVENTION

According to the invention we provide a composite article comprising a rigid, metal reinforcing core completely embedded in a covering layer of plastics material so that the external surface of the core and the internal surface of the covering layer of plastics material are free to move relative to one another and are not bonded together, the plastics material having a co-efficient of thermal expansion over a predetermined temperature range greater than the co-efficient of thermal expansion of the metal of the core, the external surface of the core presentingg to the internal surface of the covering of plastics material a first, smoothly curved concave surface part which, at a first temperature at the upper end of said range, is engaged by a portion of the covering layer which has a second, concave, smoothly curved, external surface, the first and second surfaces being aligned, the curvature of said first surface and the thickness of said portion of the covering layer being such that at a second temperature at the lower end of said range said portion of the covering layer has lifted away from said first surface thus reducing the tensile stresses which occur in said portion of the covering layer due to differential contraction of the plastics material and the metal of the core as the temperature of the article is reduced from the upper end of said temperature range to the lower end of said range as compared with the tension stresses which would occur in said portion of the plastics material if it were unable to lift off said first concave surface.

The core is preferably in the form of an elongated member and the first concave surface extends longitudinally of the core.

By this construction, the plastics material is not constrained from coming away from the concave surface of the core during cooling so that the tensile circumferential or hoop stresses i.e. the stresses in planes perpendicular to the longitudinal axis of the core, are reduced during cooling and the plastics material is less liable to fail by cracking during cooling.

Preferably the core is in the form of a frame having a number of limbs each of which presents a first, smoothly curved, concave surface which at said first temperature is engaged by one of said portions of the covering layer of the plastics material which in turn presents an external, aligned, smoothly curved concave surface as described.

In a preferred construction said portion of the plastics material has a constant thickness between the first and second concave surfaces. However the portion may have external ribs or the like which constitute a change in profile, the thickness of the portion between the ribs being substantially constant.

Normally the metal used for the core will be mild steel (0.06% C) which has a coefficient of thermal expansion of 0.126 cm/cm/°C×10$^{-4}$ when measured by ASTM Test No. D696 as are all the following coefficients of thermal expansion. Alternatively aluminium with a coefficient of thermal expansion of 0.240 cm/cm/°C×10$^{-4}$ or Duralumin with a coefficient of thermal expansion of 0.225 cm/cm/°C×10$^{-4}$ may be used. Duralumin is an alloy of aluminium, silicon, copper and magnesium.

For the covering of plastics material we prefer to use a rigid polyvinyl chloride having a coefficient of thermal expansion of 5 cm/cm/°C×10$^{-5}$ or polypropylene having a coefficient of thermal expansion of 11 cm/cm/°C×10$^{-5}$ The invention will now be described in detail by way of example with reference to the accompanying diagrammatic drawings in which:

DESCRIPTION OF THE PREFERRED EMBODIMENT

Figure 1:
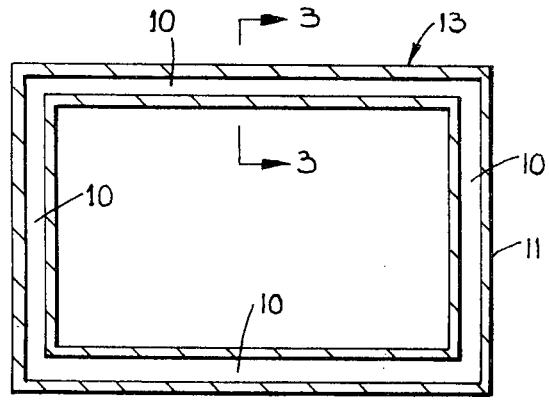
FIG. 1 is a sectional elevation of a composite article in the form of a frame embodying the invention.

Referring now to the drawings, the invention will be described in relation to the production of a composite article in the form of a window frame comprising a metal core which is substantially totally embedded or encapsulated in plastics material by, for example, injection moulding.

In U.S. Pat. Ser. No. 3,725,995 issued 10th Apr. 1973, there is described how the core may be held in a mould by pins during the moulding of the plastics material about the core and how the pins which support the core within the mould may remain in position during moulding so that when they are withdrawn they leave apertures in the plastic covering layer. It is intended to include such composite articles within the expression "substantially completely embedded or encapsulated".

Referring now to FIG. 1, the window frame is rectangular and comprises four limbs 10 totally embedded or encapsulated by a covering layer of plastics material 11. If the core is of mild steel and the covering of rigid polyvinyl chloride having the coefficients of thermal expansion mentioned above and if one considered an element of the plastics material indicated at 13 in FIG. 1 and shown enlarged in FIG. 2, during cooling of the composite article from a first temperature at the upper end of a predetermined temperature range to a second temperature at the lower end of the range, the length of the limb 10 to which the element 13 is adjacent and the cross-sectional dimensions of the limb 10 will decrease at a lower rate than the corresponding dimensions of the covering layer of plastics material for the reasons set forth above. As a result, the element will be subjected to tension stresses in perpendicular directions as indicated by the arrow in FIG. 2, the arrows 14 representing tension stresses acting circumferentially of the limb, i.e. the hoop stress, and the arrows 15 indicating tension stresses acting longitudinally of the limb.

Figure 3:
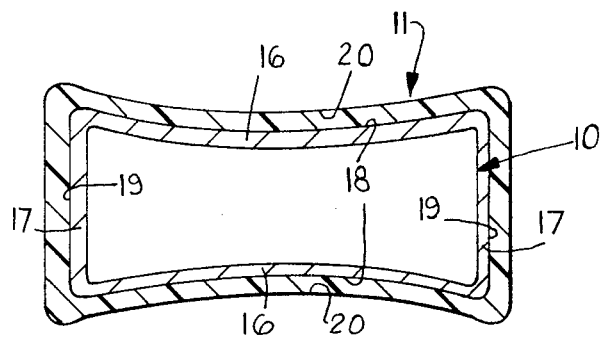
FIG. 3 is a sectional view on the line 3—3 of FIG. 1 showing the configuration of the plastics covering layer in its normal state i.e. at a first temperature.
Figure 4:
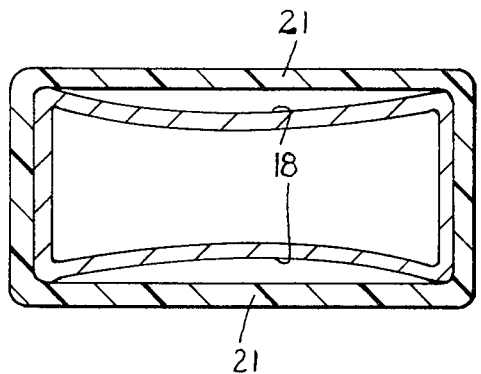
FIG. 4 is a view similar to FIG. 3 but showing the plastics covering layer lifted away from the core as it is at a second and lower temperature.

Referring now to FIGS. 3 and 4, each limb 10 of the frame core, which is made of mild steel, is hollow and formed with opposed concave surfaces extending longitudinally of the limb. Opposed sides 16 of the limb 10 have smoothly curved concave surfaces 18 which are external of the core and which are presented to the covering layer of plastics material which is rigid polyvinyl chloride. The sides 17 have planar external surfaces 19. The encapsulating plastics material 11 is, it will be seen, of constant thickness over the whole of the core so that, in the state shown in FIG. 3, it presents two smoothly curved concave surfaces 20 to the exterior of the article, such surfaces being aligned with the surfaces 18. The inner surface of the plastics material is not bonded to the external surfaces 18, 19 of the core so that said inner and external surfaces can move relative to one another. The core may be sprayed, prior to being covered with the plastics material, with a strippable coating based on a polyvinyl alcohol or ethyl cellulose. A material known as K7,832 made by Swift Production Co. of Chatteris, Cambridgeshire, UK could be used and would prevent the plastics bonding to the core during moulding of the plastics material around the core.

Figure 2:
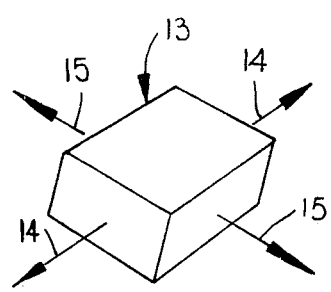
FIG. 2 is a diagram illustrating the tension stresses on an element of the plastics material in the covering layer of the frame of FIG. 1.

FIG. 3 shows the article at a temperature at the upper end of a predetermined service temperature range with the inner surface of the covering in contact with the surfaces 18. During cooling of the article from this temperature to a temperature at the lower end of said range the crosssectional dimensions of the limb 10 reduce at a lower rate and by a lesser overall amount than do the cross-sectional dimensions of the plastics covering layer because of the differences in the coefficients of thermal expansion of the core and the covering layer. However, as shown in FIG. 4, the parts 21 of the plastics covering layer lift away from the concave external surfaces 18 of the core as such parts 21 are stressed in tension and shorten relative to the lengths of the concave surfaces 18. Since the parts 21 can lift in this way the circumferential tension stresses in the plastics material of the covering layer, i.e. the stresses represented by the arrows 14 in FIG. 2, are reduced. This arrangement, therefore, allows the total stresses in the plastics material during cooling to be decreased as compared to what they would be if lift off were not permitted. Therefore, the incidence of cracking due to tensile stresses is reduced. This means that when the invention is applied to a window frame there will be less tendency for the plastics covering of the frame to crack in service during periods of cold weather.

Various modifications may be made to the invention as specifically described. Thus each limb may only have a single concave surface such as 18 and this may be sufficient to reduce the tensile stresses in the material sufficiently to avoid cracking. In a further modification all four of the external surfaces of the core may be made concave thus to reduce the circumferential tensile stresses in the plastics material to a greater extent during cooling through said temperature range then in the arrangement specifically described.

Although it is preferred that the thickness of the parts 21 of the plastics material overlying the concave surfaces 18 is constant, this is not essential. It is essential, however, that the external surfaces of the parts 21 be concave as indicated at 20 so as not to restrain the movement of the parts 21 away from the surfaces 18 during cooling. The external surfaces 21 can however be profiled, i.e. may have ribs thereon The invention has been described with reference to a window frame but may be applied to other composite articles which have to withstand thermal cycling.

It will be seen that the invention provides an improved article, particularly of frame-like shape, totally encapsulated with plastic material.

We claim:

1. A composite article comprising a rigid, metal reinforcing core completely embedded in a covering layer of plastics material so that the external surface of the core and the internal surface of the covering layer of plastics material are free to move relative to one another and are not bonded together, the plastics material having a coefficient of thermal expansion over a predetermined temperature range greater than the coefficient of thermal expansion of the metal of the core, the external surface of the core presenting to the internal surface of the covering of plastics material a first, smoothly-curved concave surface part which, at a first temperature at the upper end of said range, is engaged by a portion of the covering layer which has a second, concave, smoothly-curved, external surface, the first and second surfaces being aligned, the curvaturue of said first surface and the thickness of said portion of the covering layer being such that at a second temperature at the lower end of said range said portion of the covering layer has lifted away from said first surface thus reducing the tensile stresses which occur in said portion of the covering layer due to differential contraction of the plastics material and the metal of the core as the temperature of the article is reduced from the upper end of said temperature range to the lower end of said range as compared with the tension stresses which would occur in said portion of the plastics material if it were unable to lift off said first concave surface.

2. A composite article according to claim 1 wherein the core is in the form of an elongated member and the first concave surface extends longitudinally of the core.

3. A composite article according to claim 1 wherein the core is in the form of a frame having a number of limbs each of which presents a first, smoothly-curved, concave surface which at said first temperature is engaged by one of said portions of the covering layer of the plastics material which in turn presents an external aligned smoothly curved concave surface.

4. A composite article according to claim 1 wherein the or each said portion of the plastics material has a substantially constant thickness between said first and second concave surfaces.

* * * * *